May 12, 1959    C. M. HUFFMAN    2,886,482
WEATHER STRIPPING METHOD OF CORNER CONSTRUCTION
Filed May 8, 1956    3 Sheets-Sheet 2
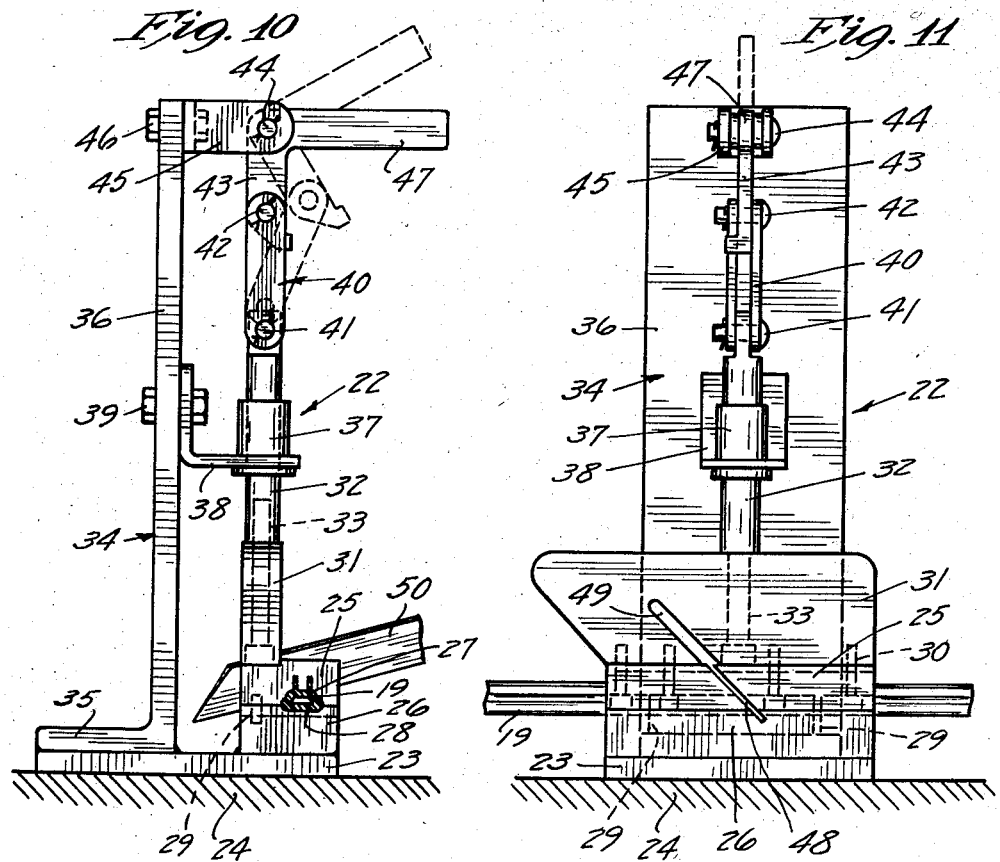
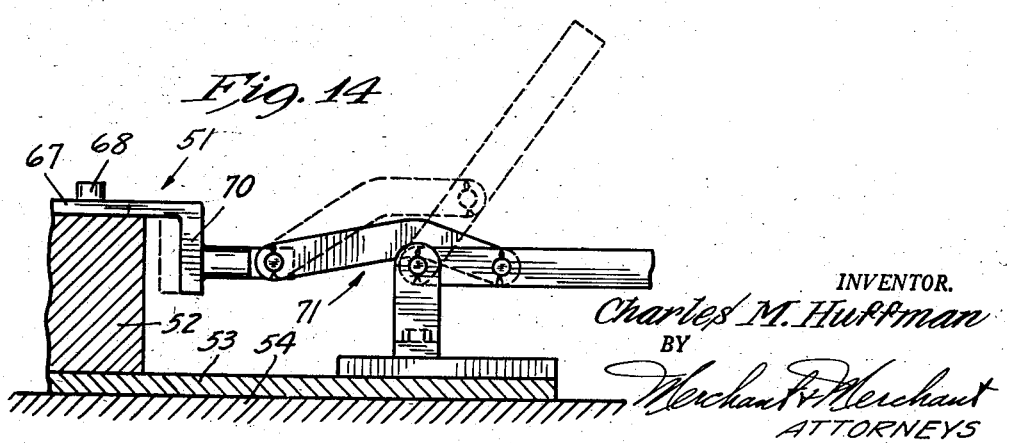
INVENTOR.
Charles M. Huffman
BY
Merchant & Merchant
ATTORNEYS May 12, 1959 C. M. HUFFMAN 2,886,482
WEATHER STRIPPING METHOD OF CORNER CONSTRUCTION
Filed May 8, 1956 3 Sheets-Sheet 3
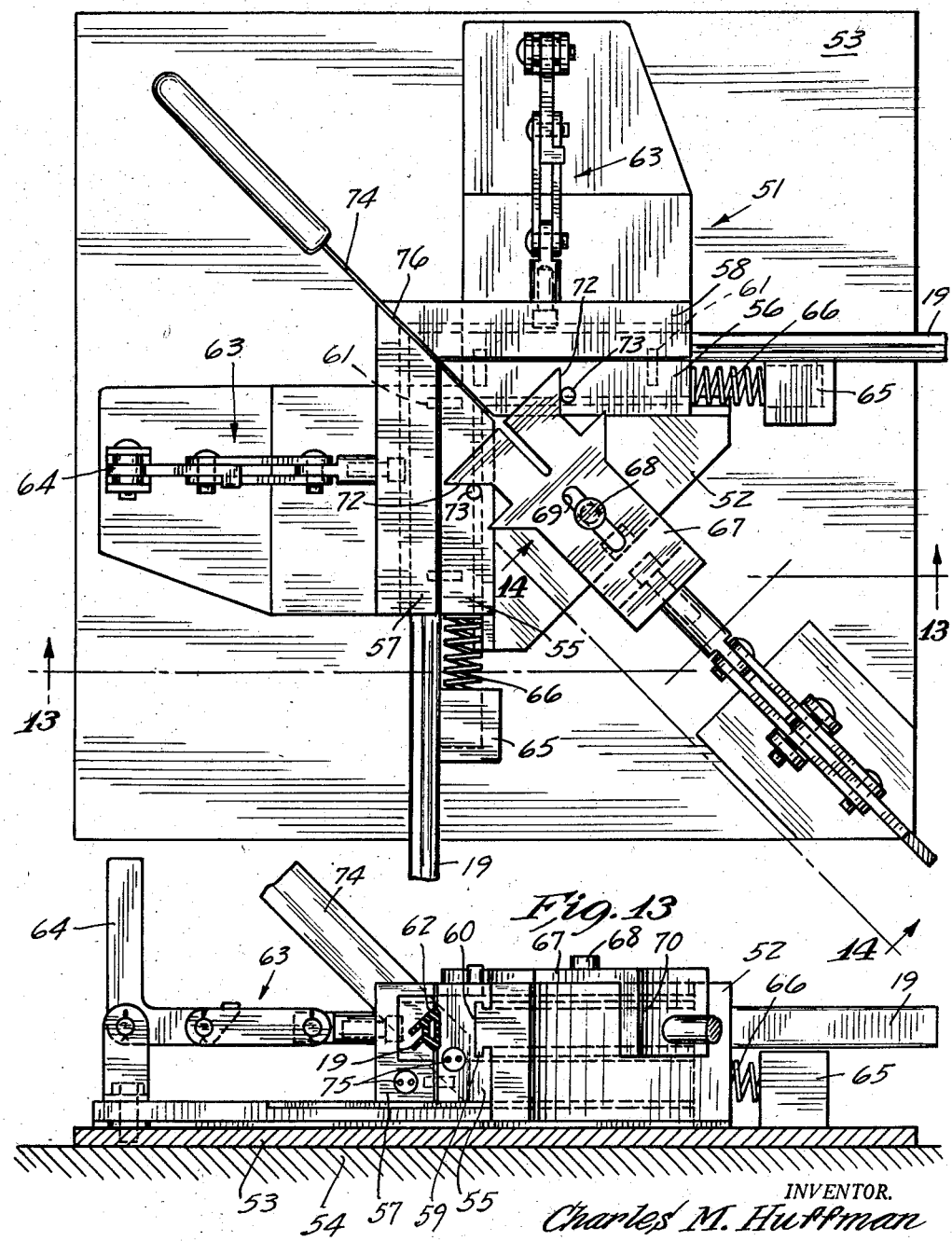
INVENTOR.
Charles M. Huffman
BY
Merchant & Merchant
ATTORNEYS

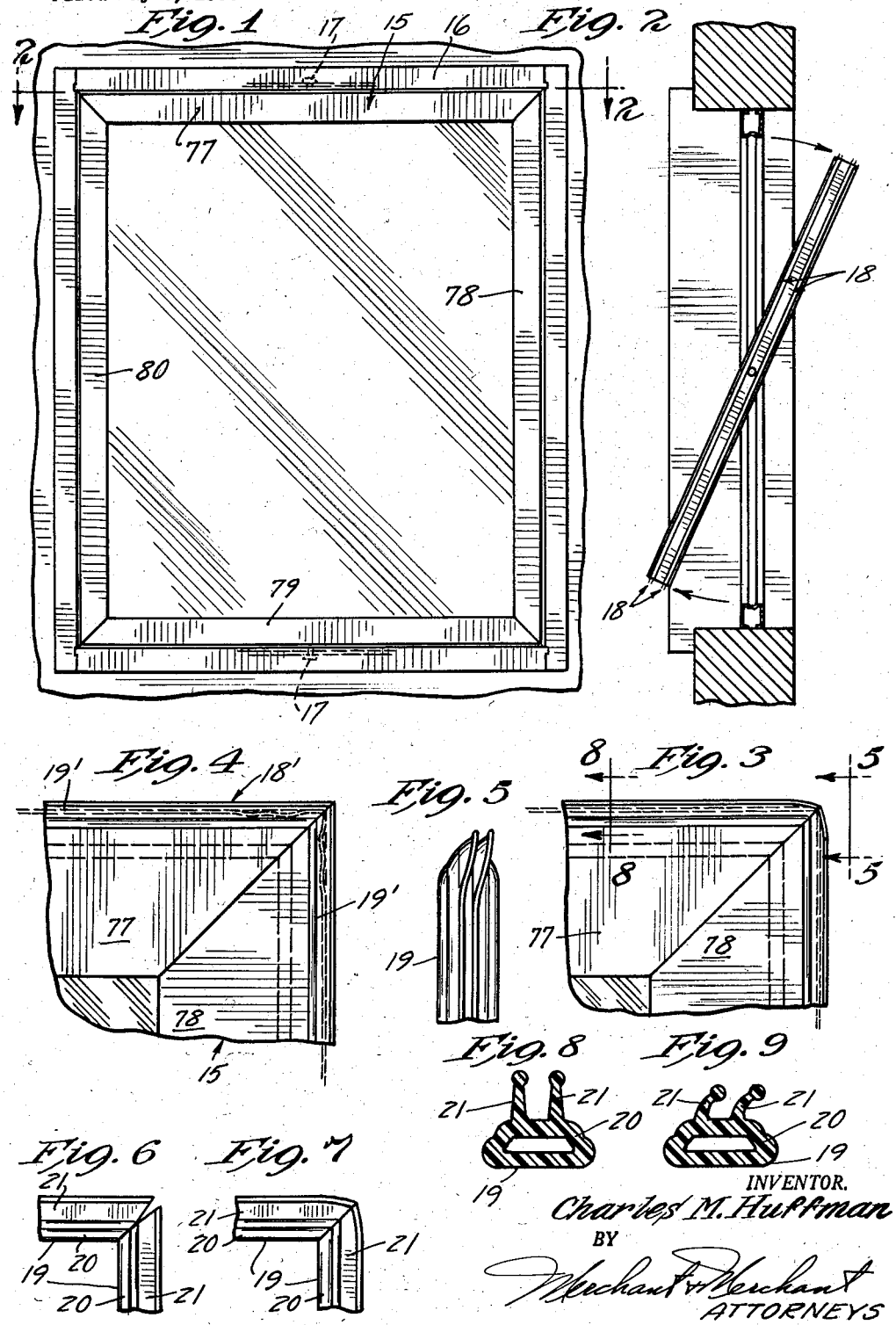

United States Patent Office 2,886,482
Patented May 12, 1959

2,886,482

WEATHER STRIPPING METHOD OF CORNER CONSTRUCTION

Charles M. Huffman, Minneapolis, Minn., assignor to Flour City Ornamental Iron Company, Minneapolis, Minn., a corporation of Minnesota Application May 8, 1956, Serial No. 583,387

5 Claims. (Cl. 154—116)

My invention relates to a novel and improved weather stripping member and a novel and improved method of joining elongated weather strips in a right angle joint to form the corner construction of said weather stripping member.

More particularly, my invention relates to a method of joining elongated weather strips in right angle joints to form a novel and improved annular rectangular weather stripping member. Each weather strip comprises an anchoring base portion and a coextensive flexible flange normally extending substantially at right angles to its base portion but which flange in an operative position between a window sash and a frame and is laterally deflected a predetermined extent from its normal position. Originally, the flanges of the weather strips were mitered and heat-sealed with the flanges in their normal or undeflected positions. However, it was found that when the flanges were deflected in service or in operation, as aforementioned, there was an excess of material adjacent the corner or mitered joint between two weather strips which caused a folding or distortion of the flanges adjacent the corner, which would leak air and water.

Generally, my invention consists in cutting the corners of the weather strips on a compound angle, as contrasted to a normal straight 45° miter, so that the flanges will form a perfect butt joint when deflected as in their operative positions, and then uniting the strips while the flanges are in such deflected positions; thereby, eliminating any excess of material adjacent the corners of the weather stripping member when the flanges are laterally deflected in service.

The primary object of my invention is to provide a novel and improved weather stripping member and a novel and improved method of joining weather strips in a right angle joint to form said weather stripping member whereby to virtually eliminate all previous corner-leakage problems and to greatly improve the sealing characteristics of the weather stripping member.

Another object of my invention is to provide a novel and improved weather stripping member and method of joining elongated weather strips to form said member wherein the weather strips comprise an anchoring base portion and a co-extensive flexible flange normally extending substantially at right angles to the base portion, and wherein said weather strips are joined together in a right angle joint along a compound angle so that the corners of the weather stripping member are laterally deflected to the position assumed in operative use, which eliminates any folding or distortion of the flanges of the strips adjacent the corners when the weather strips are in operative position between a window sash and frame.

In particular, my novel and improved weather strips are particularly adapted for use in a window construction of the pivoted reversible type wherein the sash is pivotally connected to the frame for swinging movements about a vertical central axis. These windows are generally intended to rotate through 360° and only in one direction. Thus, the directions of deflection of the flanges at the corners of the weather stripping member are predetermined depending upon the direction of rotation of the window sash; and the weather stripping member can be formed accordingly.

The above and other objects and advantages of my invention will become apparent in the course of the following specification and claims, reference being had to the drawings wherein:

Fig. 1 is a fragmentary view in side elevation showing a pivoted reversible window construction operatively installed in a window opening formed in a building wall;

Fig. 2 is a view partly in horizontal section and partly in top plan taken substantially on the line 2—2 of Fig. 1, showing the sash pivoted to a partially open position;

Fig. 3 is an enlarged fragmentary view in side elevation of a portion of Fig. 1 showing the weather stripping member of my invention anchored to the window sash of Fig. 1, wherein in full lines the weather stripping member is in a normal undistorted position, that is, the flanges are not in engagement with and deflected by the window frame, and in dotted lines the weather stripping member of my invention is shown as it would appear when in engagement and deflected by the window frame, that is, shown as it would appear in operative use between the sash and frame of the window construction of Fig. 1;

Fig. 4 is a view similar to Fig. 3 showing a weather stripping member not of this invention, having the strips thereof mitered and heat-sealed with the flanges in a normal undeflected position, in full lines the weather stripping member is shown in a normal undeflected position and in dotted lines the weather stripping member is shown as it would appear in engagement with and deflected by the window frame or as the weather stripping member would appear in operative position between the window sash and frame of Fig. 1;

Fig. 5 is an enlarged fragmentary view of the weather stripping member of my invention as viewed in elevation substantially along the line 5—5 of Fig. 3;

Fig. 6 is a fragmentary view in side elevation of the end portions to be joined of two weather strips disposed at right angles to each other and showing the compound mitering of the flanges of these strips, prior to integrally joining the strips in a corner joint;

Fig. 7 is a view similar to view 6 showing the end portions of the strips of Fig. 6 joined in a 90° angle joint;

Fig. 8 is an enlarged view in vertical section taken on the line 8—8 of Fig. 3 and showing a section of the weather stripping member in its normal undistorted position as shown in full lines in Fig. 3;

Fig. 9 is a view similar to Fig. 8 taken on the line 8—8 of Fig. 3 and showing a section of the weather stripping member in its operative deflected position, as shown in dotted lines in Fig. 3;

Fig. 10 is a view in side elevation of a cutting jig used in the practice of the method of my invention;

Fig. 11 is a view in front elevation of the cutting jig shown in Fig. 10;

Fig. 12 is a view in top plan of a joinder fixture used in the practice of the method of my invention;

Fig. 13 is a view partly in side elevation and partly in vertical section taken substantially on the irregular line 13—13 of Fig. 12; and Fig. 14 is a fragmentary view in side elevation taken substantially on the line 14—14 of Fig. 12.

Referring now more particularly to the drawings, wherein like parts shall be indicated by the same numeral, Figs. 1 and 2 show a window construction of the pivoted reversible type wherein a sash member 15 is pivotally connected to a frame member 16 by the pivot pins 17 or the like, for swinging movements about a central vertical axis, defined by pivot pins 17, through 360° in the direction indicated by the arrows in Fig. 2. Sash member 15 and frame member 16 may be constructed as shown and described in the Grady and Huffman co-pending application for "Weather Strip in Pivoted Window Construction," Serial No. 562,871, filed February 1, 1956. The above identified application may be referred to for a more specific description of the reversible window construction of Figs. 1 and 2, and a further description here with respect thereto will not be necessary. I wish to mention, however, that my instant invention is not limited in use to the aforementioned window construction, but such is merely indicated as a specific illustrative example.

As also with respect to the above-identified co-pending application, I herein provide a pair of annular rectangular weather stripping members, indicated generally by the numeral 18, each comprising four elongated weather strips rigidly joined together at their ends in right angle joints in an annular rectangular form. The individual elongated weather strips, joined to form the weather stripping member 18, shall be indicated by the numeral 19; and the numeral 18 shall indicate the complete annular rectangular weather stripping member. Each of the weather strips 19 is substantially equal in length to the rail member of sash 15 with which it is to be anchored.

Each of the weather strips 19 comprises an elongated base portion 20 and a pair of flexible normally laterally spaced generally parallel flanges 21 integrally adjoining base portion 20 in outwardly projecting normally generally perpendicular relationship therewith, with the exception of the corner construction as shown in Fig. 5, whereat the flanges 21 are normally laterally deflected to the deflected positions flanges 21 assume under operative conditions, which will be further clarified hereinafter. Base portions 20 of the weather strips 19 may be anchored to sash member 15 as shown and described in the above-identified co-pending application; and flanges 21 will be adapted to engage the frame member 16 in sealing engagement as is also more specifically brought out in said above-identified co-pending application.

Fig. 4 shows a weather stripping member which is different from the weather stripping member 18 of Fig. 3 insofar as it has a different corner construction. The weather stripping member of Fig. 4 shall be indicated by the numeral 18'; and Fig. 4 shows two weather strips 19' thereof joined together in a 90° mitered joint. There is nothing unusual about the joinder of weather strips 19'. The ends of the weather strips 19' are mitered along a straight 45° angle to match in a 90° angle joint and heat-sealed together with the flanges thereof in their normal undeflected positions, that is, with the flanges thereof projecting outwardly in approximately perpendicular relationship with the base portion. The normal undeflected positions of weather strips 19' are shown in full lines in Fig. 4. In dotted lines in Fig. 4, weather strips 19' are shown as they appear in engagement with frame member 16 whereby the flanges of weather strips 19' adjacent the corner of the sash member 15 are laterally deflected approximately 45°; and there occurs a folding or distortion of the flanges of weather strips 19' which would leak air and water past the weather strip 18'.

The improvement in weather stripping member 18 over weather stripping member 18' consists in cutting the ends of weather strips 19 on a compound angle, as contrasted to the straight 45° miter of weather strips 19', so that the flanges 21 will form a perfect butt joint when deflected to the position assumed in use; and then uniting the weather strips 19 in a right angle joint while the flanges 21 are in their deflected positions. A comparison of the dotted-line showing of weather strip 18 in Fig. 3 and the dotted-line showing of weather stripping member 18' in Fig. 4 shows that the flanges of the former are not folded and distorted adjacent the corner joint when weather stripping member 18 is in operative use as is the case with weather stripping member 18', as aforementioned.

The compound mitering of the ends to be joined of weather strips 19 is shown in Fig. 6. The base portions 20 of weather strips 19 are cut along a straight 45° miter; the flanges 21, however, are cut along an angle back from the straight 45° miter angle and are cut to match in a 90° miter joint when the flanges are approximately in the deflected positions they will assume under operative conditions. The cutting of weather strips 19 might be accomplished in any suitable manner, but a preferred method of mitering and joining weather strips 19 will be hereinafter specifically set forth. After cutting or mitering the ends of weather strips 19 as shown in Fig. 6, along the compound angle, the mitered ends of weather strips 19 are joined together as shown in Fig. 7, in any suitable manner. Preferably, weather strips 19 are formed of a thermoplastic material, and preferably a vinyl plastic or resin material, so that weather strips 19 might be joined by heat sealing. That is, heat is applied to the mitered ends of weather strips 19 for heating the end surfaces to be joined to a plastic tacky adhesive state. The adhesive surfaces are then moved into engagement and become welded together.

Referring now more particularly to my novel and improved method of joining weather strips 19 in a right angle joint, I have used the cutting jig, indicated generally by the numeral 22, shown in Figs. 10 and 11 for the purpose of mitering the ends to be joined of each weather strip 19 along a straight 45° miter angle so that two weather strips 19 will approximately match in a 90° angle joint. Cutting jig 22 includes a plate-like mounting base which may be rigidly anchored to a supporting table 24 in any suitable manner. Cutting jig 22 comprises cooperating upper and lower clamping members 25 and 26, respectively, having cooperating open-ended channels 27 and 28 formed therein which are formed to receive elongated weather strips 19. Lower clamping member 26 is rigidly anchored to mounting base 23 by welding or the like; and upper clamping member 25, which is relatively movable with respect to lower clamping member 26, is mounted on lower clamping member 26 for vertical upward movement with respect thereto by a pair of laterally spaced vertically disposed pins 29. Rigidly anchored to upper clamping member 25 by bolts 30 is a connecting block 31, which in turn is connected to a vertically movable stem 32 by bolt 33. An L-shaped supporting standard 34 has a generally horizontal flange portion 35 rigidly anchored to base 23 by welding or the like, and an upstanding vertical flange portion 36 disposed in laterally spaced generally parallel relationship with clamping members 25 and 26 and connecting block 31. A supporting guide sleeve 37 encompasses stem 32 and is supported in position by mounting bracket 38. Sleeve 37 is rigidly anchored to mounting bracket 38, by welding or the like, and mounting bracket 38 in turn is connected to flange 36 of supporting standard 34 by a bolt 39. The upper end of stem 32 is pivotally connected to one end of a toggle arm 40 by pivot pin 41. The other end of toggle arm 40 is pivotally connected by pivot pin 42 to the second arm 43 of the toggle. L-shaped toggle arm 43 is pivotally connected at the intersection of the right angle arm portions thereof by pin 44 to a bifurcated supporting member 45, which is rigidly connected to the upper end of flange 36 by bolt 46. The outwardly projecting free arm portion, indicated by the numeral 47, of toggle arm 43 serves as a handle for operating the toggle.

At the straight line position of toggle arms 43 and 40, upper clamping plate 25 is maintained by pressure in matched relationship with lower clamping member 26 to firmly hold the weather strip 19 in proper position. Upon upward movements of the handle portion 47 of toggle arm 43, the toggle is broken, as shown in dotted lines in Fig. 10, to move stem 32, connecting block 31, and upper clamping member 25 vertically upwardly to freely permit either insertion or removal of a weather strip 19 between the clamping members 25 and 26. Clamping members 25 and 26 are provided with cooperating slots to form the fixed kerf, indicated by the numeral 48, for guiding a cutting instrument at the proper miter angle. Kerf 48 is disposed to provide a straight 45° angle miter cut. As clearly shown in Fig. 11, connecting block 31 is provided with a slot 49 which cooperates with kerf 48 to form an enlarged upward extension thereof for the purpose of permitting easy insertion of a cutting instrument. I have shown a fragment of a cutting knife in Fig. 10, indicated by the numeral 50, for cutting the weather strips 19 in the jig 22.

The operation of cutting jig 22 will be generally obvious to one skilled in the art. Briefly, however, an elongated piece of weather strip 19 to be cut to the proper length and mitered at its opposite ends along a 45° angle is inserted between clamping members 25 and 26 when toggle arms 40 and 43 are in their broken dotted line positions, as shown in Fig. 10. Generally, the piece of weather strip 19 is inserted from left to right as viewed in Fig. 11 until that portion of the piece of weather strip 19 to the right of kerf 48, as viewed in Fig. 11, is the proper length, taking into account any loss of material at the opposite end of said portion during mitering of the opposite end. After the piece of weather strip 19 has been inserted in the proper position, handle portion 47 of toggle arm 43 is moved downwardly to position the parts of cutting jig 22 as shown in full lines in Fig. 10. This clamps weather strip 19 in proper position; and knife 50 is first inserted in slot 49 and then drawn through kerf 48 to miter one end of weather strip 19 along a 45° angle when the flanges 21 are in their normal generally perpendicular relationship with base portion 20. Next, handle portion 47 is moved upwardly to break the toggle as shown in dotted lines in Fig. 10, to permit removal of the cut portions of weather strip 19. That portion of the cut piece of weather strip 19 positioned to the right of kerf 48, as viewed in Fig. 11, has now been properly mitered at its left end as viewed in Fig. 11; and this portion is then reversed in the clamping members 25 and 26 by insertion of said cut portion into clamping members 25 and 26 from the right to the left as viewed in Fig. 11, with the unmitered end of said portion being first inserted. Weather strip 19 is then properly positioned to miter the opposite end thereof along a straight 45° miter. The movable elements of the cutting jig 22 are moved to their full line position as shown in Fig. 10 to clamp weather strip 19 in position, and cutting knife 10 is then inserted to cut the miter as aforementioned.

The aforementioned follows through the method of using cutting jig 22 to miter the opposite ends of a single weather strip 19. It is clear that four of the weather strips 19 are mitered in this manner to form one weather stripping member 18. In using cutting jig 22, it is clear that each individual weather strip 19 need not be mitered as aforementioned; but cutting jig 22 might be used to first miter one end of each of several weather strips 19 and then used to miter the other end of the same weather strips. What is accomplished with cutting jig 22 is to miter the opposite ends of weather strips 19 to match in a right angle joint, or mitered along a stright 45° angle, when the flanges 21 are in their normal perpendicular relationship with the base portion 20.

Next, two of the weather strips 19, which have been mitered in cutting jig 22 as aforementioned, are positioned in the joinder fixture, indicated generally by the numeral 51 and shown in Figs. 12–14.

Joinder fixture 51 comprises a generally triangular standard 52 which is rigidly anchored, by welding or the like, to a base portion 53 which in turn may be rigidly anchored by any suitable means to a supporting table 54. Joinder fixture 51 comprises a pair of inner clamping members 55 and 56 and a pair of outer clamping members 57 and 58. Standard 52 is formed with laterally outwardly projecting tongues 59 at the right angle sides thereof which cooperate with grooves 60 formed in inner clamping members 55 and 56 to mount the latter at right angles to each other onto standard 52 for guided longitudinal movement toward and away from the apex of standard 52. Each of the outer clamping members 57 and 58 is laterally outwardly movable with respect to its associated inner clamping members, 55 and 56 respectively, and each is connected to its associated inner clamping member 55 and 56, for limited longitudinal movement therewith by spaced pins 61. Pins 61 also insure proper matching between the cooperating inner and outer clamping members. The inner and outer clamping members, 55–58, are beveled at adjacent ends to match in a 90° angle joint, or along a straight 45° miter angle, as clearly shown in Fig. 12. Each outer clamping member, 57 and 58, and its associated inner clamping member, 55 and 56, respectively, have cooperating channels formed therein which define an open ended longitudinally extending cavity 62 formed to receive in form-matching relationship a weather strip 19. It should be particularly noted that the portions of cavities 62 which receive the flanges 21 of weather strips 19 are disposed at an angle of 45° to the normal undeflected positions of flanges 21, so that flanges 21 when positioned between clamping members 57 and 55 or clamping members 58 and 56 are laterally deflected downwardly at an angle of approximately 45°. This will be brought out further subsequently.

I provide a pair of toggles of the type commonly used in jig and fixture work, each generally indicated by the numeral 63, for controlling the lateral movement of each of the outer clamping members 57 and 58. Each toggle 63 is connected at one end to a different one of the outer clamping members 57 and 58 and at an opposite end is connected to the base portion 53. It is clear that at the straight line position thereof, each of the toggles 63 maintains its associated outer clamping member in matched relationship with the associated inner clamping member, 55 or 56. The straight line positions of each of the toggles 63 is shown in Figs. 12 and 13. Upon a rearward and downward movement of an upwardly projecting handle portion 64 of each of the toggles 63, which handle portion is a right angle extension of one of the toggle arms, toggle 63 is broken to move its associated outer clamping member, 57 or 58, laterally outwardly away from its associated inner clamping member, 55 or 56. Movement of the handle portion 64 in the opposite direction, that is generally upwardly and forwardly, acts to return the toggle 63 to its straight line position and to move the associated outer clamping member, 57 or 58, back into matched relationship with its associated inner clamping member, 55 or 56. True matched relationship is assured by virtue of pins 61. Toggles 63 are capable of slight lateral movement between the opposite ends thereof, so that each of the outer clamping members 57 and 58 is capable of a limited longitudinal movement with each of its associated inner clamping members 55 and 56. Joinder fixture 51 comprises a pair of recessed housing members 65, each anchored to the base portion 53, by welding or the like, in longitudinally spaced aligned relationship with a different one of the inner clamping members 55 and 56. A pair of compression springs 66 are disposed each between a different one of the housing members 65 and the inner clamping member, 55 or 56, aligned therewith. Each of the housing members 65 is recessed to receive one end of its associated compression spring 66. Springs 66 act to yieldably bias inner clamping members 55 and 56, and therewith their associated outer clamping members 57 and 58, toward each other and into abutment of the beveled ends thereof into a right angle joint.

Joinder fixture 51 comprises a plate-like cam element indicated by the numeral 67 connected to standard 52 by bolt 68 working in slot 69, whereby cam element 67 is longitudinally movable alternately in opposite directions toward and away from the apex of standard 52, Cam element 67 has a depending flange 70 at one end thereof to which is connected a clamping toggle, indicated generally by the numeral 71, of the type generally used in fixture or jig work. At the full line generally straight line position of toggle 71, as shown in Fig. 14, cam element 67 is at its limit of movement away from the apex of standard 52 and upon breaking the toggle 71 by movement thereof to its dotted line position, as shown in Fig. 14, cam element 67 is moved toward the apex of standard 52. Cam element 67 is notched at its opposite sides and defines straight cam surfaces 72, each adapted to engage a different one of a pair of upright pins 73 which are rigidly connected each to a different one of the inner clamping members 55 and 56. When clamping toggle 71 is in its broken position, as shown in dotted lines Fig. 14, inner and outer clamping members 55–58 have their beveled ends in abutting engagement. Upon movement of clamping toggle 71 from its broken position, shown in dotted lines in Fig. 14, to its straight line clamping position, shown in full lines Fig. 14, cam element 67 in engagement with pins 73 moves inner clamping members 55 and 56 simultaneously, and therewith outer clamping members 57 and 58, back from abutting engagement against the bias of springs 66 an amount, equidistant in both directions, sufficient to permit the insertion of a cutting instrument between the beveled ends of inner and outer clamping members 55–58, as shown in Fig. 12. Clamping toggle 71 at its straight line position maintains cam element 67 in position to hold inner and outer clamping members 55–58 in their separated position. Movement of the toggle 71 from its approximate straight line position moves cam element 67 towards the apex of standard 52 which permits compression springs 66 to move inner and outer clamping members 55–58 into abutting engagement, as aforementioned.

I provide a heated cutting instrument which may be any suitable electrically heated knife, indicated by the numeral 74. Each of the clamping members 55–58 is provided with a conventional electrical resistance heater 75 to heat said inner and outer clamping members during operation of the joinder fixture 51 so as to limit dissipation of heat from the knife 74 and insure proper welding of the weather strips 19.

The operation of joinder fixture 51 is as follows: initially, clamping toggle 71 is in its generally straight line position, as shown in full lines in Fig. 14, wherein clamping members 55–58 are maintained against the bias of spring 66 in their separated positions, that is, the beveled ends of clamping members 55–58 are separated sufficiently to permit the insertion of the knife 74. Toggles 63 are broken to move outer clamping members 57 and 58 laterally away from their associated inner clamping members 55 and 56, respectively, to permit the insertion of the weather strips 19 each in a different one of the cavities 62, that is, one between clamping members 57 and 55 and the other between clamping members 58 and 56. Weather strips 19 are positioned so that the ends to be joined thereof extend slightly beyond the beveled ends of clamping members 55–58, approximately 1/32 of an inch. Next, toggles 63 are then returned to their straight line clamping positions and outer clamping members 57 and 58 engage their associated inner clamping members 55 and 56, under the pressure of toggles 63, to properly clamp weather strips 19 in position. Knife 74, which is electrically heated to a temperature above the melting temperature of the vinyl weather strips 19, is positioned in the slot, indicated by the numeral 76, formed by the separation between the beveled ends of clamping members 55–58 between the weather strips 19. Clamping toggle 71 is then moved to its broken position, as shown in dotted lines in Fig. 14, whereby springs 66 will move clamping members 55–58 toward each other and therewith move weather strips 19 into engagement with the heated knife 74. Heated knife 74 will simultaneously miter the ends to be joined of weather strips 19 to match in a 90° angle joint when the flanges 21 are in the deflected position they will assume in operative use, that is, when the flanges 21 are laterally deflected approximately 45° from their normal perpendicular relationship with base portion 20, and will heat the beveled or mitered end surfaces of weather strips 19 to a plastic adhesive state. On passing the knife through slot 76 and out from between weather strips 19 and clamping members 55–58, springs 66 will move clamping members 55–58 toward each other and will move weather strips 19 into abutting engagement for welding the plastic adhesive surfaces thereof together. Upon removal of the heated knife 74, the heated ends of weather strips 19 will cool to form a solidified joint. Heaters 75 will not maintain the plastic adhesive state of weather strips 19, effected by knife 74, but are merely for the purpose of preventing a too rapid dissipation of the heat from knife 74 and to insure a proper weld between weather strips 19. After the joint between weather strips 19 has solidified, toggles 63 may be broken to move outer clamping members 57 and 58 laterally outwardly to permit the removal of the joined weather strips 19.

What has been said with respect to joining two weather strips 19 at a corner joint in joinder fixture 51 applies as well to forming a complete weather stripping member 18, which is a repetition of the steps to form one corner joint in order to form four corner joints between four weather strips 19. With respect to a complete weather stripping member 18, it should be pointed out that preferably sash member 15 is constructed to rotate 360° only in one direction, which direction is indicated by the arrows in Fig. 2. It is preferable that weather stripping member 18 be formed so that the two corner joints disposed at the right side as viewed in Fig. 1, of the pivot axis of sash member 15, as defined by pivot pins 17, deflect laterally outwardly; and the two corner joints at the left side of the pivot axis of sash member 15, as viewed in Fig. 1, are laterally deflected in the opposite direction, that is, laterally inwardly. Sash member 15 as viewed in Fig. 1 is being viewed from the inside.

An illustrative example of the forming of a complete weather stripping member 18 is as follows: A weather strip 19 approximately the length of and adapted to be anchored to upper horizontal rail 77 of sash member 15 may be joined to a weather strip 19 approximately the length of and adapted to be anchored to the vertical side rail 78 of sash member 15 in joinder fixture 51 as aforementioned. Next, the free end of the last mentioned weather strip 19, that is, the one adapted to be anchored to vertical rail 78, will be inserted as aforementioned between outer clamping member 57 and inner clamping member 55 and a third weather strip 19, approximately the length of and adapted to be anchored to lower horizontal rail 79 of sash member 15, will be inserted between outer clamping member 58 and inner clamping member 56 and these two weather strips 19 will be joined as aforementioned. Next, the joined weather strips will be turned over so that the two corners formed will be laterally deflected upwardly; and the free end of the last-mentioned weather strip, that is, the one adapted to be anchored to rail 79, may be inserted between clamping members 58 and 56 and a fourth weather strip 19, approximately the length of and adapted to be anchored to vertical side rail 80 of sash member 15, may be inserted between clamping members 57 and 55 and the corner formed as aforementioned. Lastly, the corner will be formed between the weather strip 19 adapted to be anchored to rail 77 and the weather strip 19 adapted to be anchored to the vertical rail 80 by inserting the former between clamping members 57 and 55 and the latter between clamping members 58 and 56, and forming the joined corner as aforementioned. It should be recognized that the foregoing order of joining the four weather strips 19 in a weather stripping member 18 was merely illustrative; and it is clear that there is no specific order in which the four weather strips 19 must be joined.

It is believed that my novel and improved method of joining a pair of like elongated weather strips to form a right angle joint is clear from the foregoing description of the operation of cutting jig 22 and joinder fixture 51. Generally, my novel and improved method comprises mitering the end portions to be joined of weather strips 19 to match in a 90° mitered joint when the flanges 21 are approximately in the deflected position they will assume under operative conditions and when the end portions are maintained in longitudinally straight unbuckled conditions, specifically the deflected positions which flanges 21 assume adjacent the corners of weather stripping member 18 under operative conditions is approximately a lateral deflection of 45° from their normal perpendicular relationship with the base portion 20, and then integrally joining the mitered ends of weather strips 19 while maintaining the strips at substantially a 90° angle with respect to one another and while maintaining flanges 21 in the deflected positions which they assume under operative conditions.

Specifically, cutting jig 22 is used to miter each weather strip 19 to approximately match in a 90° miter joint before mitering and joining weather strips 19 in joinder fixture 51. It should be noted that weather strips 19 in cutting jig 22 have their flanges 21 maintained in their normal undeflected positions. It would be possible to provide a cutting jig, similar to cutting jig 22, having clamping members which would maintain flanges 21 in the laterally deflected positions they would assume in use much in the same manner as the clamping members of joinder fixture 51. Thus, flanges 21, adjacent the end portion to be joined thereof, of a weather strip 19 would be laterally deflected to approximately the deflected position assumed under operative conditions and the end portion to be joined thereof would be mitered to match in a 90° mitered joint; then, the other strip to be joined to the one just mitered would have its flanges 21 adjacent the end portion to be joined thereof, laterally deflected to approximately the deflected position assumed under operative conditions and the end portion to be joined would be mitered to match in a 90° joint with the first mitered strip; and then the two weather strips 19 which have been mitered to be joined in a 90° angle joint, would be joined together while maintaining the strips at substantially a 90° angle with respect to one another and while maintaining the flanges 21 thereof in their deflected positions, much in the manner of the use of joinder fixture 51. Instead of a pre-mitering of weather strips 19 with flanges 21 thereof in an undeflected position, as with cutting jig 22, this would comprise a mitering of each weather strip 19 in a jig similar to cutting jig 22 but wth the flanges 21 adjacent the end to be joined maintained laterally deflected to the approximate portions assumed in use. Changing the structure of cutting jig 22 as directly hereabove mentioned, would eliminate any flash upon actual joining of the weather strips 19 in a joinder fixture, similar to joinder fixture 51 herein specifically disclosed, and would eliminate the necessity of removing such flash.

It should be noted that the flanges 21 of the horizontal weather strips 19, that is, weather strips 19 anchored to horizontal rails 77 and 79 of sash member 15, laterally deflected in operative use in one direction on one side of the pivot axis of sash member 15 and laterally deflected in the opposite direction on the other side of said pivot axis, and there is a reversal of the direction of deflection of the flanges 21 of horizontal weather strips 19 adjacent the pivot axis of sash member 15. This is particularly shown in Fig. 6 of the aforementioned Grady and Huffman co-pending application for "Weather Strip in Pivoted Window Construction," Serial No. 562,871, filed February 1, 1956. Where I have hereinbefore or hereinafter stated that flanges 21 of weather strips 19 are laterally deflected to the operative positions they assume in operative use, I do not intend to mean that any weather strip 19 is laterally deflected to the specific position of the aforesaid horizontal weather strips 19 wherein there is a reversal of deflection adjacent the central portion thereof, but I have reference to the lateral deflection of the end portions of weather strips 19. As aforementioned, this lateral deflection is generally approximately 45° from a normal perpendicular relationship with base portion 20; however, I do not intend to be limited to a specific lateral deflection of 45°.

My novel and improved weather stripping member 18 has been actually formed by the methods herein specifically described and has been used in combination with the pivoted window construction of Figs. 1 and 2. The window construction of Figs. 1 and 2 in combination with weather stripping members 18 has been subjected to scientific and rigid tests, even under hurricane conditions, with wind velocities up to 145 miles per hour, and with water introduced into the air stream. Testing of weather stripping members 18 in the window construction of Figs. 1 and 2 was extremely impressive and has virtually eliminated all previous corner-leakage problems in window constructions of this type.

It will be obvious to those skilled in the art that my invention may be modified in many respects and that this disclosure is intended to be illustrative only; therefore, I intend to be limited solely by the scope of the appended claims.

What I claim is:

1. A method of joining a pair of like elongated weather strips to form a right angle joint and which strips each comprise an anchoring base portion and a coextensive flexible flange normally extending substantially at right angles to its base portion but which flange is laterally deflected under operative conditions a predetermined extent form its said normal position, said method comprising mitering the end portions to be joined of the strips to match in a 90° miter joint when the flanges are approximately in the deflected positions they will assume under operative conditions and when the end portions are maintained in longitudinally straight unbuckled condition, and integrally joining the mitered ends of said strips while maintaining the strips at substantially a 90° angle with respect to one another and while maintaining said flanges in said deflected positions.

2. A method of joining a pair of like elongated weather strips to form a right angle joint and which strips each comprise an anchoring base portion and a coextensive flexible flange normally extending substantially at right angles to its base portion but which flange is laterally deflected under operative conditions a predetermined extent from its said normal position, said method comprising laterally deflecting the end portions to be joined of the flanges of said strips to approximately the deflected positions they will assume under operative conditions, mitering the end portions to be joined of the strips when the flanges are in such deflected positions to match in a 90° miter joint, and integrally joining the mitered ends of said strips while maintaining the strips at substantially a 90° angle with respect to one another and while maintaining said flanges in their deflected positions.

3. A method of joining a pair of like elongated weather strips to form a right angle joint and which strips each comprise an anchoring base portion and a coextensive flexible flange normally extending substantially at right angles to its base portion but which flange is laterally deflected under operative conditions a predetermined extent from its said normal position, said method comprising laterally deflecting an end portion of the flange of one strip to approximately the deflected position it will assume under operative conditions, mitering said end portion of said one strip when the flange is in such deflected position to match in a 90° miter joint, laterally deflecting an end portion of the flange of the other of said strips to approximately the deflected position it will assume under operative conditions, mitering said end portion of said other strip when the flange is in such deflected position to match in a 90° miter joint with said one strip, and integrally joining the mitered ends of said strips while maintaining the strips at substantially a 90° angle with respect to one another and while maintaining said flanges in their deflected positions.

4. A method of joining a pair of like elongated weather strips to form a right angle joint and which strips each comprise an anchoring base portion and a coextensive flexible flange normally extending substantially at right angles to its base portion but which flange is laterally deflected under operative conditions a predetermined extent from its said normal position, said method comprising mitering each strip to approximately match in a 90° miter joint, laterally deflecting the end portions to be joined of the flanges of said strips to approximately the deflected positions they will assume under operative conditions, mitering the end portions to be joined of the strips when the flanges are in such deflected positions to match in a 90° miter joint, and integrally joining the mitered ends of said strips while maintaining the strips at substantially a 90° angle with respect to one another and while maintaining said flanges in their deflected positions.

5. A method of joining a pair of like elongated weather strips of thermoplastic material to form a right angle joint and which strips each comprise an anchoring base portion and a coextensive flexible flange normally extending substantially at right angles to its base portion but which flange is laterally deflected under operative conditions a predetermined extent from its said normal position, said method comprising mitering each strip to approximately match in a 90° miter joint, positioning said strips to be disposed at substantially a 90° angle with respect to one another with their mitered ends closely adjacent and to be disposed with their flanges laterally deflected in the same direction approximately 45° from their normal positions, passing a heated cutting instrument between the closely adjacent strips for mitering said end portions of the strips to match in a 90° mitered joint when the flanges are in said deflected positions and for heating the end surfaces to be joined to a plastic tacky adhesive state, and moving said mitered and heated ends of said strips into engagement and maintaining them in engagement until joined.

References Cited in the file of this patent

UNITED STATES PATENTS

| | | |
|---|---|---|
| 2,278,756 | Wright | Apr. 7, 1942 |
| 2,364,962 | Eagles | Dec. 12, 1944 |
| 2,503,882 | Medford | Apr. 11, 1950 |
| 2,607,091 | Dodge | Aug. 19, 1952 |
| 2,629,905 | Kessler et al. | Mar. 3, 1953 |
| 2,711,779 | Carland | June 28, 1955 |
| 2,760,243 | Korb | Aug. 28, 1956 |
| 2,794,221 | Bedics | June 4, 1957 |